(12) United States Patent
Hammond-Smith et al.

(10) Patent No.: US 7,344,762 B2
(45) Date of Patent: Mar. 18, 2008

(54) PRINTABLE LIQUID CRYSTAL MATERIAL

(75) Inventors: Robert Hammond-Smith, Hampshire (GB); John Patrick, Dorset (GB); Rodney Riddle, Dorset (GB)

(73) Assignee: Merck Patent GmbH, Darmstadt (DE)

( * ) Notice: Subject to any disclaimer, the term of this patent is extended or adjusted under 35 U.S.C. 154(b) by 318 days.

(21) Appl. No.: 10/698,946

(22) Filed: Nov. 3, 2003

(65) Prior Publication Data

US 2004/0155221 A1 Aug. 12, 2004

(30) Foreign Application Priority Data

Feb. 11, 2002 (EP) ................................. 02024321

(51) Int. Cl.
*C09K 19/38* (2006.01)
*C09K 19/30* (2006.01)
*C09K 19/20* (2006.01)

(52) U.S. Cl. .................. 428/1.1; 428/1.3; 252/299.01; 252/299.63; 252/299.67

(58) Field of Classification Search .......... 252/299.01, 252/299.67, 299.6, 299.63; 428/1.1, 1.3
See application file for complete search history.

(56) References Cited

U.S. PATENT DOCUMENTS

| | | | |
|---|---|---|---|
| 4,614,619 A | | 9/1986 | Shannon |
| 4,637,896 A | | 1/1987 | Shannon |
| 5,518,652 A | * | 5/1996 | Parri et al. ............. 252/299.01 |
| 5,720,900 A | * | 2/1998 | Parri et al. ............. 252/299.66 |
| 5,798,147 A | | 8/1998 | Beck et al. |
| 6,013,197 A | * | 1/2000 | Parri et al. ............. 252/299.01 |
| 6,136,225 A | * | 10/2000 | Meyer et al. .......... 252/299.01 |
| 6,207,770 B1 | * | 3/2001 | Coates et al. ................. 526/63 |
| 2003/0085377 A1 | * | 5/2003 | Dunn et al. ............ 252/299.01 |
| 2004/0155221 A1 | * | 8/2004 | Hammond-Smith et al. ........... 252/299.01 |

FOREIGN PATENT DOCUMENTS

| | | | |
|---|---|---|---|
| EP | 0 940 707 | * | 9/1999 |
| EP | 0940707 A1 | | 9/1999 |
| GB | 2280445 | * | 2/1995 |
| GB | 2 357 061 | * | 6/2001 |
| GB | 2357061 A | | 6/2001 |
| JP | 8-231958 | | 9/1996 |
| JP | 2003-193053 | * | 7/2003 |
| JP | 2003-287620 | * | 10/2003 |

OTHER PUBLICATIONS

English translation by computer for JP 2003-287620, http://www.4.ipdl.ncipi.go.jp/Tokujitu/PAJdetail.ipdl?N0000=60&N0120=01&N2001=2&N3001=2003-287620.*
Kurihara et al., "Liquid-Cyrstalline Polymer Networks: Effect of Cross-Linking on the Stability of Marcoscopic Molecular Orientation", Marcomolecules 1999, vol. 32, pp. 3150-3153.*
Abstract of Japan—Database WPI, Section Ch, Week 199646, Derwent Publications Ltd., London, GB; Class A14, AN 1996-461581, XP-002275594 -& JP 08 231958 A (Dainippon Ink & Chem Inc), Sep. 10, 1996.

* cited by examiner

*Primary Examiner*—Shean C Wu
(74) *Attorney, Agent, or Firm*—Millen, White, Zelano, Branigan, P.C.

(57) ABSTRACT

The invention relates to the use of a printable polymerisable liquid crystal material as printable system for the preparation of polymers and pigments, to printable polymerisable liquid crystal materials and pigments and polymers prepared thereof, and to the use of the printable materials, pigments and polymers in optical, electrooptical, semiconductor and electronic applications and as birefringent and optically variable markings for decorative, security, authentification or identification applications.

26 Claims, No Drawings

PRINTABLE LIQUID CRYSTAL MATERIAL

FIELD OF THE INVENTION

The invention relates to the use of a printable polymerisable liquid crystal material as printable system for the preparation of polymers and pigments. The invention further relates to printable polymerisable liquid crystal materials and pigments and polymers prepared thereof, and to the use of the printable materials, pigments and polymers in optical, electrooptical, semiconductor and electronic applications and as birefringent and optically variable markings for decorative, security, authentification or identification applications.

BACKGROUND AND PRIOR ART

Birefringent films comprising polymerised liquid crystal (LC) material are known in prior art. For example, GB 2 324 382, GB 2 330 360 and GB 2 357 061 disclose films comprising polymerised or crosslinked nematic or cholesteric LC material with planar, tilted, splayed or homeotropic structure and macroscopically uniform orientation.

Polymerised LC films are usually prepared by dissolving a mixture of two or more polymerisable LC compounds in an organic solvent and coating the solution onto a substrate. The solvent is allowed to evaporate and the remaining LC material is quickly polymerised by exposure to UV radiation while it is still in its LC phase. The polymerisation fixes the oriented structure and consequently the anisotropical properties of the material. It is also possible for example to prepare cholesteric liquid crystal (CLC) pigment flakes from a polymerised CLC film by separating the film from the substrate and grinding it to give small flakes, as described in WO 97/30136.

By using printing techniques it is possible to cover discrete areas of a substrate with an LC material to form a pattern, or to directly prepare LC pigments of a specific size and shape.

For example, WO 97/30136 discloses a specific method, i.e., gravure printing, in the shape of small droplets of a specific size onto a substrate, a chiral polymerizable mesogenic material, to form pigment flakes.

WO 96/02597 describes for example a process for printing substrates with a polymerisable CLC material.

However, LC materials often have a high viscosity and high surface tension, which impairs their printing behaviour and leads to wetting problems, undesired structure formation and difficulties in achieving uniform alignment in the printed areas. The LC materials disclosed for example in WO 96/02597 therefore additionally comprise dispersion auxiliaries. However, the use of additives like dispersion auxiliaries increases the material costs and can also negatively affect the optical properties of the LC material.

On the other hand, if the viscosity of the LC material is too low problems can arise when trying to print different LC materials alongside each other with good resolution. For example, if organic solutions of LC materials are used for this purpose it is possible that the low viscosity of the solution causes the LC materials to mix, thereby ruining the desired pattern.

It was therefore an aim of the present invention to provide a polymerisable LC material that is suitable as a system for the preparation of printed polymer films, coatings and layers and does not have the drawbacks of the prior art materials. The LC material should have an LC phase at room temperature, be suited for printing without the need for high temperatures and without the use of modifiers, thinners, dispersion agents, polymerisable binders or monomer compounds that can be converted into a polymer binder by polymerisation or solvents, and should help to form the required structure necessary to achieve specific optical effects in LC polymer films. In particular, the LC material should have a suitable viscosity, which is high enough to enable printing with high resolution and low enough to allow good wetting of the substrate and alignment and avoid undesired structure formation.

A further aim of this invention relates to a method of preparing polymers, in particular oriented polymer films, patterns, images and pigments from a printable, polymerisable LC material according to this invention, which allows a fast, reliable and inexpensive fabrication.

A further aim of this invention relates to the use of nematic liquid crystal mixtures as printable systems for the preparation of polymer films, markings and pigment flakes.

A further aim of this invention relates to the use of chiral nematic liquid crystal mixtures as printable systems for the preparation of opticaly variable polymer films, markings and pigment flakes.

A further aim of this invention is to provide an advantageous use of the LC materials, polymers and pigments according to this invention, in particular in optical, electrooptical, electronic, semiconducting, decorative and security applications.

A further aim of this invention is the advantageous use of chiral nematic liquid crystal mixtures according to this invention especially for use on paper and other porous substrates.

Further aims of this invention relate to optical, electrooptical, electronic, semiconducting, decorative, security, authentification and identification markings or devices comprising an LC material, polymer or pigment according to this invention.

Other aims of the present invention are immediately evident to the person skilled in the art from the following detailed description.

The inventors have found that the above aims can be achieved by providing a polymerisable LC material as described below.

Definition of Terms

In connection with liquid crystal layers and films as described in the present application, the following definitions of terms as used throughout this application are given.

The term 'film' as used in this application includes self-supporting, i.e. free-standing, films or foils that show more or less pronounced mechanical stability and flexibility, as well as precoated, preprinted or laminated foils wherein the coating or printing can be partial or complete, as well as coatings or layers on a supporting substrate or between two or more substrates.

The term 'marking' includes films or coatings or layers covering the entire area of a substrate, as well as markings covering discrete regions of a substrate for example in the shape of a regular pattern or image.

The term 'liquid crystal or mesogenic material' or 'liquid crystal or mesogenic compound' should denote materials or compounds comprising one or more rod-shaped, board-shaped or disk-shaped mesogenic groups, i.e., groups with the ability to induce liquid crystal phase behaviour. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials or the mixtures thereof are polymerized.

The term 'chiral nematic' means a liquid crystal material in which the director direction varies monotonuously through the film creating a helical structure.

For the sake of simplicity, the term 'liquid crystal material' is used hereinafter for both liquid crystal materials and mesogenic materials, and the term 'mesogen' is used for the mesogenic groups of the material.

The director means the preferred orientation direction of the long molecular axes (in case of calamitic compounds) or short molecular axis (in case of discotic compounds) of the mesogens in a liquid crystal material.

The term 'planar structure', 'planar alignment' or 'planar orientation' refers to a layer or film of liquid crystal material wherein the director is,substantially parallel to the plane of the film or layer.

The term 'homeotropic structure', 'homeotropic alignment' or 'homeotropic orientation' refers to a layer or film of liquid crystal material wherein the director is substantially perpendicular to the film plane, i.e., substantially parallel to the film normal.

The term 'tilted structure', 'tilted alignment' or 'tilted orientation' refers to a layer or film of liquid crystal material wherein the director is tilted at an angle θ of between 0 and 90 degrees relative to the film plane.

The term 'splayed structure', 'splayed alignment' or 'splayed orientation' means a tilted orientation as defined above, wherein the tilt angle varies monotonuously in the range from 0 to 90°, preferably from a minimum to a maximum value, in a direction perpendicular to the film plane.

For sake of simplicity, a film comprising liquid crystal material with a planar, homeotropic, tilted or splayed orientation, alignment or structure is hereinafter also referred to as 'planar film', 'homeotropic film', 'tilted film' and 'splayed film', respectively.

The term "reflective substrate" covers substrates with mirrorlike surfaces for printing onto metal films, substrates showing Lambertian reflection, which are especially suitable when printing onto, for example, pearlescent pigment systems, and substrates that comprise or are part of an optically variable device (OVD), like, for example, a diffraction grating, hologram or kinegram.

"Reflection" means reflection of light inside the visible range of the spectrum (with wavelegnths from approximately 400 to 800 nm) and outside the visible range, e.g. in the UV or IR range (with wavelengths of less than 400 nm or more than 800 nm).

SUMMARY OF THE INVENTION

The invention relates to the use of a polymerisable liquid crystal (LC) material, preferably a polymerisable nematic or chiral nematic LC material, very preferably a polymerisable LC material having a nematic or chiral nematic phase at room temperature, as printable system for the preparation of polymer films, markings and pigments.

The invention further relates to an LC polymer, in particular an oriented LC polymer film, or marking obtained from a printable, polymerisable LC material as described above and below.

The invention further relates to an LC pigment obtained from a printable polymerisable LC material, polymer, or polymer film as described above and below.

The invention further relates to the use of a printable polymerisable LC material, a polymer, polymer film or pigment as described above and below for optical, electrooptical, decorative, security, cosmetic, diagnostic, electric, electronic, charge transport, semiconductor, optical recording, electroluminescent, photoconductor and electrophotographic applications.

The invention further relates to a decorative, security, authentification or identification marking, thread or device comprising a polymer, polymer film, coating or layer or pigment as described above and below.

The invention further relates to an object, a document, for example, a document of value, or hot stamping foil comprising a decorative, security, authentification or identification marking, thread or device as described above and below.

The invention further relates to a polymerisable LC material comprising at least one compound of formula I and/or at least one compound of formula II

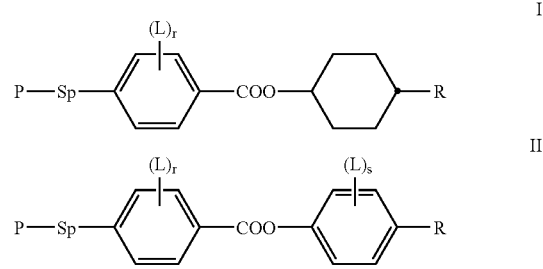

wherein

P is a polymerisable group,

Sp is a spacer group or a single bond,

R is halogen, straight chain or branched alkyl with 1 to 20 C-atoms, which is unsubstituted, mono- or polysubstituted, in each case independently, with F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —$SO_2$—, —S—CO—, —CO—S—, —CH=CH— or —C≡C— in such a manner that O and/or S atoms are not linked directly to one another, $R^0$ and $R^{00}$ are independently of each other H or alkyl with 1 to 12 C-atoms.

L is F, Cl, Br, or an alkyl, alkoxy, alkylcarbonyl or alkoxycarbonyl group with 1 to 12 C atoms, wherein one or more H atoms are optionally replaced by F or Cl, and r and s are independently of each other 0, 1, 2, 3 or 4, and its use as printable system described above and below.

DETAILED DESCRIPTION OF THE INVENTION

The polymerisable LC material according to the present invention has a viscosity which is particularly suitable for printing with good resolution, whilst enabling good wetting of the substrate and uniform alignment of the LC material.

The viscosity of the polymerisable LC material is preferably from 30 to 2000 centistokes, very preferably from 400-1000 centistokes.

Polymer films are prepared preferably by printing the polymerisable LC material onto a substrate, where the LC molecules are aligned into uniform orientation, and polymerising the LC material in its aligned LC phase.

The polymerisation is preferably carried in the LC phase of the polymerisable LC material. Especially preferred are temperatures below 70° C., very preferably below 60° C., in particular below 50° C., most preferably within a temperature range that is identical to the temperature range of the LC phase of preferred LC materials as given below.

Especially preferred is a polymerisable LC material that
is a nematic LC material, preferably having a nematic phase at room temperature,
is a chiral nematic or cholesteric LC material, preferably having a chiral nematic or cholesteric phase at room temperature,
comprises at least one chiral compound, which can be a polymerisable compound or a non-polymerisable compound,
comprises at least one compound which induces and/or enhances planar alignment, in particular a surfactant, preferably a nonionic surfactant,
comprises at least one polymerisable mesogenic compound having two or more polymerisable groups,
comprises at least one polymerisable mesogenic compound having one polymerisable group which can be the compounds of formula I and II or further compounds,
comprises 5 to 70%, preferably 10 to 50% of compounds of formula I,
comprises 5 to 50%, preferably 10 to 40% of compounds of formula II,
comprises 7 to 90%, preferably 10 to 50% of compounds of formula I and II,
has a nematic or chiral nematic phase in the range from 0 to 50° C., preferably from 10 to 40° C.,
has a planar structure,
has a splayed structure.

A preferred polymerisable LC material comprises
3-60% of one or more direactive mesogenic compounds,
7-90%, preferably 10 to 50% of one or more monoreactive mesogenic compounds of formula I and II,
0 to 70%, preferably 20 to 60% of one or more further monoreactive mesogenic compounds,
0.1 to 10% of one or more surfactants,
0.1 to 10% of one or more photoinitiators.

The use of compounds of formulae I and II in the polymerisable LC material according to the present invention allows to provide mixtures having an LC phase at room temperature, which is especially suitable for preparing polymers and polymer films by printing and polymerization process.

For example, the compounds of formula Ia and IIa have the phase sequence as shown below:

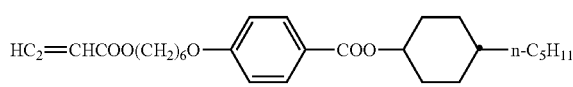

Ia

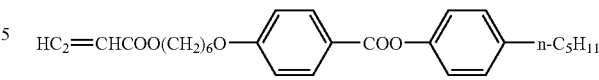

IIa

Ia: K 43.5 (N 34.8) I
IIa: K 62.4 (N 32) I

This means that although individually they do not exhibit a liquid crystal phase themselves, when mixed with other liquid crystal compounds they behave as if they have a crystal-nematic phase transition temperature of 34.8 and 32° C., respectively. They are therefore especially suitable for the preparation of polymerisable LC materials for printing.

Especially preferred are compounds of formula I and II wherein r and s are 0.

Further preferred are compounds of formula I wherein r is 1 or 2, and compounds of formula II wherein r and/or s is 1 or 2.

Further preferred are compounds of formula I and II wherein P is an acrylate, methacrylate, vinyl or epoxy group.

Further preferred are compounds of formula I and II wherein L is F or methyl.

Further preferred are compounds of formula I and II wherein R is straight chain alkyl with 1 to 15, very preferably with 2 to 8 C atoms.

Further preferred is a polymerisable material comprising at least one of compound of formula I and/or II wherein R is a chiral group.

L in formula I and II is preferably F, Cl, CN, $NO_2$, $CH_3$, $C_2H_5$, $OCH_3$, $OC_2H_5$, $COCH_3$, $COC_2H_5$, $CF_3$, $CHF_2$, $CH_2F$, $OCF_3$ $OCHF_2$, $OCH_2F$, $OC_2F_5$, in particular, F, Cl, CN, $CH_3$, $CHF_2$, $C_2H_5$, $OCH_3$, $OCHF_2$, $CF_3$ and $OCF_3$, most preferably, F, $CH_3$, $CF_3$, $OCH_3$, $OCHF_2$ and $OCF_3$.

R in formula I and II is, preferably, alkyl, preferably, straight-chain alkyl, with 1 to 15, very preferably, with 2 to 8 C atoms.

In one aspect, the compounds of formula I and/or II preferably of formula I, do not have R as —O-alkyl, for example —$OCH_3$.

If R in formula I and II is an alkyl radical, this may be straight-chain or branched. It is preferably straight-chain, has 2, 3, 4, 5, 6, 7 or 8 carbon atoms and accordingly, is preferably, ethyl, propyl, butyl, pentyl, hexyl, heptyl, or octyl, furthermore methyl, nonyl, decyl, undecyl, dodecyl, tridecyl, tetradecyl or pentadecyl, for example.

In case of chiral nematic materials, R may also be a chiral group, which is preferably of formula III:

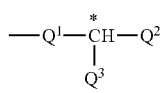

III wherein
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted, in each case independently, by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another, $Q^3$ is F, Cl, Br, CN or an alkyl or alkoxy group as defined for $Q^2$, but being different from $Q^2$.

In case $Q^1$ in formula III is an alkylene-oxy group, the O atom is preferably adjacent to the chiral C atom.

Preferred chiral groups of formula III are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

The polymerisable group P is preferably selected from $CH_2=CW^1—COO—$,

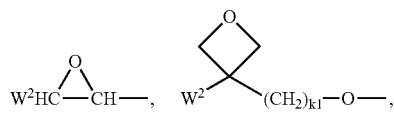 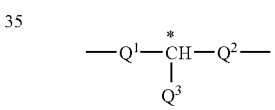

$CH_2=CW^2—(O)_{k1}—$, $CH_3—CH=CH—O—$, $(CH_2=CH)_2 CH—OCO—$, $(CH_2=CH—CH_2)_2CH—OCO—$, $(CH_2=CH)_2CH—O—$, $(CH_2=CH—CH_2)_2N—$, $HO—CW^2W^3—$, $HS—CW^2W^3—$, $HW^2N—$, $HO—CW^2W^3—NH—$, $CH_2=CW^1—CO—NH—$, $CH_2=CH—(COO)_{k1}—Phe-(O)_{k2}—$, $Phe-CH=CH—$, $HOOC—$, $OCN—$, and $W^4W^5W^6Si—$, with $W^1$ being H, Cl, CN, phenyl or alkyl with 1 to 5 C-atoms, in particular, H, Cl or $CH_3$, $W^2$ and $W^3$ being, independently of each other, H or alkyl with 1 to 5 C-atoms, in particular, methyl, ethyl or n-propyl, $W^4$, $W^5$ and $W^6$ being, independently of each other, Cl, oxaalkyl or oxacarbonylalkyl with 1 to 5 C-atoms, Phe being 1,4-phenylene, and $k_1$ and $k_2$ being, independently of each other, 0 or 1.

Especially preferably P is a vinyl group, an acrylate group, a methacrylate group, an oxetane group or an epoxy group, especially preferably, an acrylate or methacrylate group.

For the spacer group Sp all groups can be used that are known for this purpose to the skilled in the art. The spacer group Sp is preferably of formula S—X, such that P-Sp- is P—S—X—, wherein S is alkylene with up to 20 C atoms which may be unsubstituted, mono- or poly-substituted in each case independently, by F, Cl, Br, I or CN, it being also possible for one or more non-adjacent $CH_2$ groups to be replaced, in each case independently from one another, by —O—, —S—, —NH—, —NR°—, —SiR°R°°—, —CO—, —COO—, —OCO—, —OCO—O—, —S—CO—, —CO—S—, —CH=CH— or —C≡C— in such a manner that O and/or S atoms are not linked directly to one another, X is —O—, —S—, —CO—, —COO—, —OCO—, —O—COO—, —CO—NR°—, —NR°—CO—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR°—, —CX$^1$=CX$^2$—, —C≡C—, —CH=CH—COO—, —OCO—CH=CH— or a single bond, $X^1$ and $X^2$ are, independently of each other, H, F, Cl or CN, and R° and R°° are, independently of each other, H or alkyl with 1 to 12 C-atoms.

X is preferably —O—, —S—, —COO—, —OCO—, —O—COO— or a single bond.

Typical groups S are for example —(CH$_2$)$_p$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$— or —(SiR°R°°—O)$_p$—, with p being an integer from 2 to 12, r being an integer from 1 to 3 and R° and R°° having the meanings given in formula I.

Preferred groups S are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In case of chiral nematic materials S may also be a chiral group, which is preferably selected of formula IV:

$$—Q^1—\overset{*}{CH}—Q^2—$$
$$\underset{Q^3}{|}$$

wherein $Q^1$ is an alkylene or alkylene-oxy group with 1 to 10 C atoms or a single bond, $Q^2$ is an alkylene or alkylene-oxy group with 1 to 10 C atoms or a single bond, being different from $Q^1$, and $Q^3$ is halogen, a cyano group or an alkyl or alkoxy group with 1 to 4 C atoms, different from $Q^2$.

In case $Q^1$ in formula IV is an alkylene-oxy group, the O atom is preferably adjacent to the chiral C atom.

The polymerisable LC material preferably comprises at least one monoreactive achiral polymerisable mesogenic compound and at least one di- or multireactive achiral polymerisable mesogenic compound.

If di- or multireactive compounds are present in the polymerisable LC material, a three-dimensional polymer network is formed and the orientation of the LC material is permanently fixed. A polymer film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability and/or the solvent resistance can be tuned easily.

The compounds of formula I and II and the additional polymerisable mesogenic mono-, di- or multireactive compounds which can be present in the mixtures according to the instant invention can be prepared by methods which are known per se and which are described, for example, in standard works of organic chemistry such as, for example, Houben-Weyl, Methoden der organischen Chemie, Thieme-Verlag, Stuttgart. Typical examples for possible additional polymerisable compounds are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful mono- and direactive polymerisable mesogenic compounds that can be used as co-monomers in addition to compounds of formula I and II are shown in the following list of compounds, which should, however, be taken only as illustrative and is in no way intended to restrict, but instead to explain the present invention:

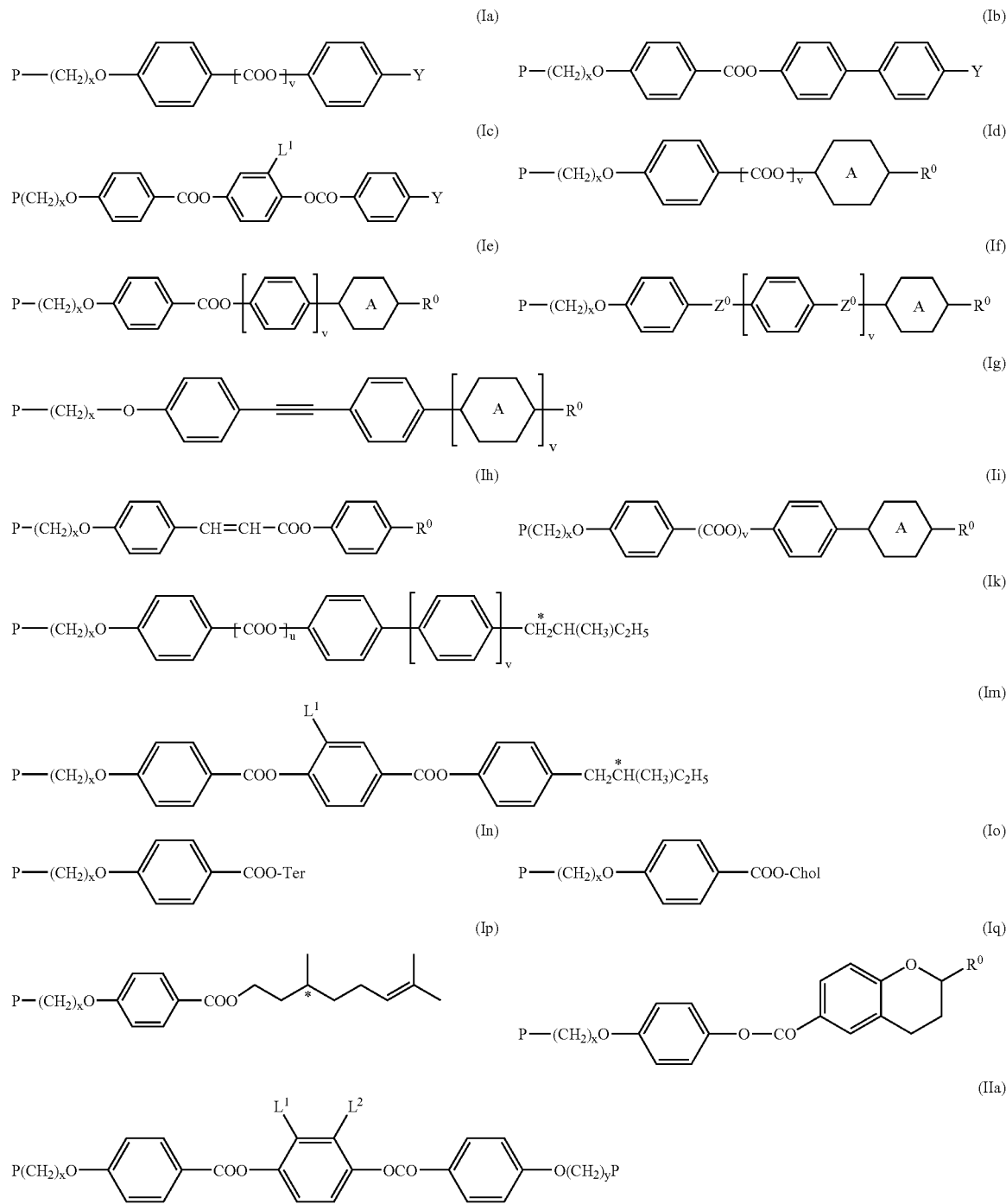

-continued

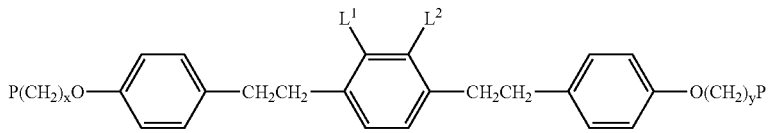
(IIb)

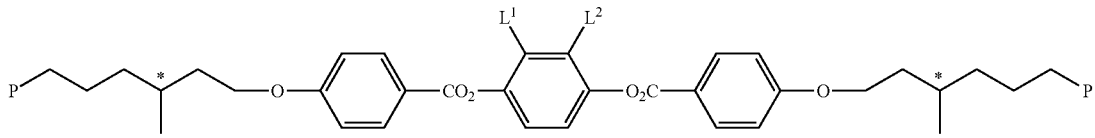
(IIc)

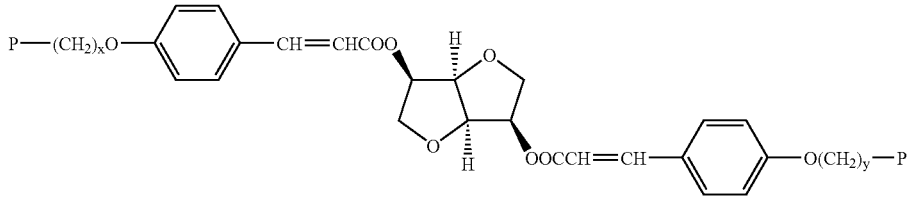
(IId)

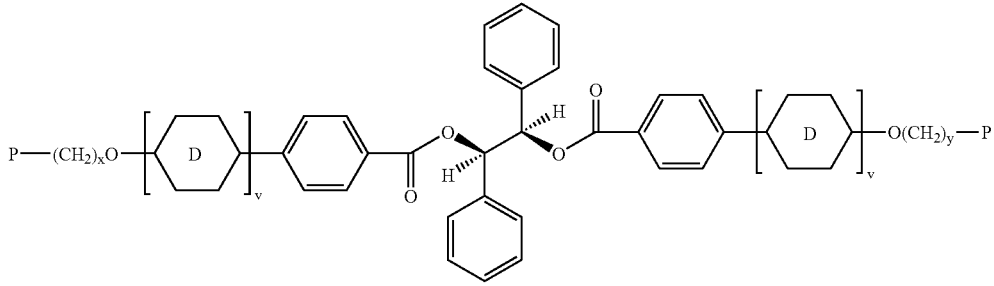
(IIe)

In the above formulae, P is a polymerisable group, preferably an acryl, methacryl, vinyl, vinyloxy, propenyl ether, epoxy or styryl group, x and y are each independently 1 to 12, A and D are 1,4-phenylene that is optionally mono-, di- or trisubstituted by $L^1$ or 1,4-cyclohexylene, u and v are 0 or 1, $Z^0$ is —COO—, —OCO—, —CH$_2$CH$_2$—, —C≡C— or a single bond, Y is a polar group, $R^0$ is an non-polar alkyl or alkoxy group, Ter is a terpenoid radical, for example, menthyl, Chol is a cholesteryl group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms. The phenyl rings are optionally substituted by 1, 2, 3 or 4 groups L; L is as defined in formula I.

The term 'polar group' in this connection is, for example, a group selected from F, Cl, CN, NO$_2$, OH, OCH$_3$, OCN, SCN, an optionally fluorinated carbonyl or carboxyl group with up to 4 C atoms or a mono-oligo- or polyfluorinated alkyl or alkoxy group with 1 to 4 C atoms. The term 'non-polar group' is, for example, an alkyl group with 1 or more, preferably 1 to 12 C atoms or an alkoxy group with 2 or more, preferably 2 to 12 C atoms.

A polymerisable LC material with a chiral nematic or cholesteric phase preferably comprises one or more achiral polymerisable mesogenic compounds and at least one chiral compound. The chiral compound can be selected from non-polymerisable chiral compounds, for example, conventional chiral dopants, or polymerisable chiral compounds, all of which can be mesogenic or non-mesogenic.

Suitable polymerisable chiral compounds are, for example, those of above formulae Ik-Iq and IIc-IIe. Further suitable chiral polymerisable compounds are, for example, the commercially available Paliocolour® materials (from BASF AG, Germany).

Further suitable are chiral compounds with a high helical twisting power (HTP), in particular chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195, all of which can be polymerisable or not.

Suitable nonreactive chiral dopants can be selected, for example, from the commercially available R or S 811, R or S 1011, R or S 2011 or CB 15 (from Merck KGaA, Darmstadt, Germany). The references discussed in the previous paragraph also teach suitable non reactive chiral dopants.

The preferred amount of non-polymerisable chiral compounds in the polymerisable LC mixture is from 0.1 to 10%, preferably 0.5 to 6%.

The preferred amount of polymerisable chiral compounds is from 0 to 30%, preferably 0 to 20%, very preferably 0 to 6%.

In a preferred embodiment the polymerisable LC material comprises an additive that induces or enhances planar alignment of the liquid crystal material on the substrate. Preferably the additive comprises one or more surfactants. Suitable surfactants are described for example in J. Cognard, Mol. Cryst. Liq. Cryst. 78, Supplement 1, 1-77 (1981).

Particularly preferred are non-ionic surfactants, very preferably, fluorocarbon surfactants, for example, the commercially available fluorocarbon surfactants Fluorad FC-171® (from 3M Co.), or Zonyl FSO® ((from DuPont).

Suitable and preferred fluorocarbons surfactant are, for example, those of formula I

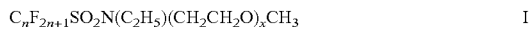
$$C_nF_{2n+1}SO_2N(C_2H_5)(CH_2CH_2O)_xCH_3 \qquad I$$

wherein n is an integer from 4 to 12 and x is an integer from 5 to 15, which are commercially available as Fluorad FC-171® (from 3M Co.).

The lower limit of the amount of the additives inducing planar alignment in the polymerisable LC material is preferably 0.01 weight %, in particular 0.05 weight %, most preferably 0.1 weight % of the liquid crystal material. The upper limit of the amount of said compounds is preferably 5 weight %, in particular 3 weight %, most preferably 1.5 weight % of the liquid crystal material.

The polymerisable LC material is printed onto a substrate and polymerised, for example, by exposure to UV radiation.

Suitable substrates include films, paper, board, leather, cellulose sheeting, textiles, plastics, glass, ceramics and metals. Suitable polymer films are for example polyester such as polyethyleneterephthalate (PET) or polyethylenenaphthalate (PEN), polyvinylalcohol (PVA), polycarbonate (PC) or triacetylcellulose (TAC), especially preferably PET or TAC. For nematic liquid crystal mixtures especially preferred are substrates metallised with aluminium, or aluminium foils. For chiral nematic liquid crystal mixtures especially preferred are dark or black substrates, furthermore paper or other porous substrates.

The nematic polymerisable LC material according to the present invention is preferably applied to a reflective substrate, for example, a metallised polymer film, paper printed with an iridescent pigment, a reflective cholesteric LC film, a hot stamping foil, or any other reflective substrate. The substrate may also be part of an OVD, like a hot stamping foil or a holographic image. The substrate may have a flat or a structured or patterned surface.

Thus, for example, a substrate like a banknote, or selected regions thereof, can have applied to it a hologram or reflective metal layer, onto which the LC material is printed. Alternatively a film is prepared separately on a reflective substrate which is then applied to a document of value, for example, as security thread or as another form of a security marking.

This embodiment is particularly suitable for use as false-proof security threads or holograms on banknotes or documents of value, providing a security marking by which the banknote is easy to authenticate when viewed through a polariser.

The LC material may be applied onto one side or onto both sides of the substrate. It may be printed onto discrete regions of the substrate to form a pattern or image that is, for example, visible under unpolarised light due to a change in the surface gloss in the printed areas, or may be invisible under unpolarised light and become visible only when viewed through a polariser. Alternatively the LC material may be printed onto the entire substrate to form a continuous layer or film that becomes visible only when viewed through a polariser.

In a preferred embodiment of the present invention the chiral nematic polymerisable LC material is applied to a black substrate, like for example, a dyed polymer film, black paper, paper printed with a dark or black ink, or any other dark substrate. The substrate may have a flat or a structured or patterned surface.

Thus, for example, a substrate like a banknote, or selected regions thereof, can have applied to it a dark printed region, onto which the LC material is printed. Alternatively a film is prepared separately on a dark substrate which is then applied to a document of value, for example, as security thread or as another form of a security marking.

In another preferred embodiment two or more chiral nematic materials are provided on the substrate, for example, in form of a pattern, wherein the chiral nematic materials differ from each other in their handedness and/or their reflection colour and/or their colour flop (colour shift with varying viewing angle). For example, a pattern of two chiral nematic materials that reflect circular polarised light of the same reflection colour but of opposite handedness can be printed onto a substrate. This pattern cannot be seen when viewed under unpolarised light, but becomes visible when viewed through an either right-handed or left-handed circular polariser. In case of a pattern of two chiral nematic materials with different reflection colour or different colour flop, the pattern is visible also for the naked eye.

The above described preferred embodiments are particularly suitable for use as false-proof security threads or holograms on banknotes or documents of value, providing a security marking by which the banknote is easy to authenticate when viewed through the correct circular polariser.

The LC material may be applied onto one side or on both sides of the substrate. It may be printed onto discrete regions of the substrate to form a pattern or image that is, for example, invisible under unpolarised light and become visible only when viewed through a circular polariser. Alternatively the LC material may be printed onto the entire substrate to form a continuous layer or film whose polarisation state can be determined only when viewed through a circular polariser.

Printing methods include conventional printing techniques which are known to the expert, including, for example, screen printing, offset printing, dry offset printing, reel-to-reel printing, letter press printing, gravure printing, rotogravure printing, flexographic printing, intaglio printing, pad printing, heat-seal printing, ink-jet printing, thermal transfer printing or printing by means of a stamp or printing plate. The printing process induces or enhances spontaneous alignment of the LC material on the substrate.

Polymerisation of the LC material can be achieved, for example, by exposing it to heat or actinic radiation. Actinic radiation means irradiation with light, like, UV light, IR light or visible light, irradiation with X-rays or gamma rays or irradiation with high energy particles, such as ions or electrons. Preferably, polymerisation is carried out by UV irradiation. As a source for actinic radiation, for example, a single UV lamp or a set of UV lamps can be used. When using a high lamp power the curing time can be reduced. Another possible source for actinic radiation is a laser, for example, a UV laser, an IR laser or a visible laser.

The polymerisation is carried out in the liquid crystal phase of the polymerisable liquid crystal material. The polymerisation time is dependent, inter alia, on the reactivity of the polymerisable LC material, the thickness of the printed layer, the type of polymerisation initiator and the power of the UV lamp. The polymerisation time according to the invention is preferably not longer than 10 minutes, particularly preferably not longer than 5 minutes and very particularly preferably shorter than 2 minutes. For mass production short polymerisation times of 3 minutes or less, very preferably of 1 minute or less, in particular of 30 seconds or less, are preferred.

The polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. In case of polymerisable compounds with acrylate or methacrylate groups, preferably, a radical photoinitiator is used, in case of compounds with vinyl and epoxide groups, preferably, a cationic photoinitiator is used. It is also possible to use a polymerisation initiator that decomposes when heated to produce free radicals or ions that start the polymerisation. As a photoinitiator for radical polymerisation, for example, the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The optimum range of the thickness of the polymerised LC film depends upon the strength of the birefringence of the LC material in the case of nematic liquid crystal mixtures and the required reflected colour in the case of chiral nematic films. The person skilled in the art can determine easily the optimum range of the thickness. Preferably the film thickness is from 0.2 to 20 µm, very preferably from 0.2 to 10 µm, most preferably from 0.5 to 5 µm.

The polymerisable LC material may additionally comprise one or more other further additives, for example, non-polymerisable liquid crystal compounds, catalysts, sensitizers, inhibitors, stabilizers, chain transfer agents, lubricating agents, wetting agents, dispersing agents, hydrophobing agents, adhesive agents, flow improvers, defoaming agents, deaerators, inert diluents, reactive diluents, auxiliaries, colourants, dyes or pigments. Suitable additives are disclosed, for example, in WO 00/47694, the entire disclosure of which is incorporated into this application by reference. Preferably the material does not contain further additives. Particularly preferably the material does not contain a dispersing agent.

The polymer films and pigments according to this invention can be used in decorative, security, authentification or identification applications, as security, authentification or identification marking, or in a thread or device comprising the birefringent marking. For example, it is possible to prepare a metallic thread with a polymerised LC material as described above and then apply this thread to a security document, either as part of a hot stamping foil (HSF) or as a woven thread. According to a further embodiment the liquid crystal material is applied directly to a reflecting area on an existing security document. e.g. overprinting the reflecting area on a banknote.

The films and pigments marking can be used for direct application, for example, onto an article, device or document, or as threads, holograms or hot stamping foils for decorative or security applications, to authenticate and prevent counterfeiting of documents of value, for identification of hidden images, informations or patterns. They can be applied to consumer products or household objects, car bodies, foils, packing materials, clothes or woven fabric, incorporated into plastic, or applied as security markings or threads on documents of value, like banknotes, credit cards or ID cards, national ID documents, licenses or any propduct with money value, like stamps, tickets, shares, cheques etc.

The polymerisable nematic LC materials, polymers and polymer films according to the present invention can also be used in optical components like polarisers, reflective polarisers, retardation films, compensators, colour filters, patterned films, or holographic elements, or for the preparation of such components.

In the foregoing and in the following examples, unless otherwise indicated, all temperatures are set forth uncorrected in degrees Celsius and all parts and percentages are by weight. The following abbreviations are used to illustrate the liquid crystalline phase behaviour of the compounds: K=crystalline; N=nematic; S=smectic; N*, Ch=chiral nematic or cholesteric; I=isotropic. The numbers between these symbols indicate the phase transition temperatures in degree Celsius.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

The following polymerisable LC mixture is prepared

| | |
|---|---|
| Compound (A) | 23.5% |
| Compound (B) | 25.9% |
| Compound (C) | 17.8% |
| Compound (D) | 9.8% |
| Compound (E) | 8.4% |
| Compound (F) | 8.6% |
| Irgacure 907 | 5.7% |
| Zonyl FSO | 0.4% |

(A)

(B)
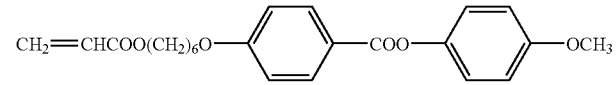

(C)

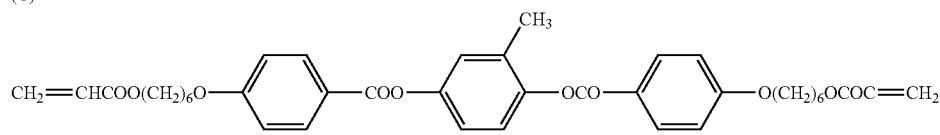

(D)

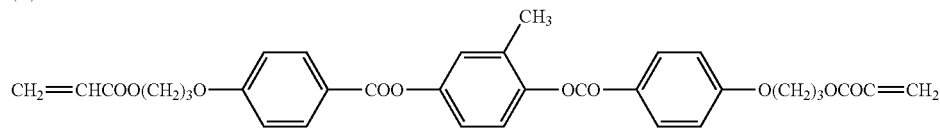

(E)

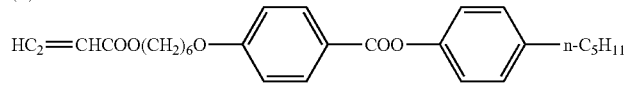

(F)

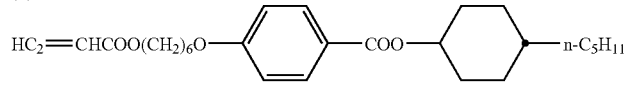

Compounds (A) to (F) can be prepared according to or in analogy to the methods described in D. J. Broer et al., Makromol. Chem. 190, 3201-3215 (1989). Irgacure 907 is a commercially available photoinitiator (Ciba Geigy). Zonyl FSO is a commercially available surfactant (DuPont).

The mixture has the LC phase sequence K 3 N 43 I and a viscosity of 600-700 centistokes.

The compounds are heated until an isotropic mixture is formed and then allowed to cool. The mixture can be stored at a temperature of 5° C. without losing its nematic phase.

A sample of the LC mixture was applied onto a polymer printing plate wrapped around a roller. This was then rolled onto a piece of metallised foil and the printed mixture was cured using UV radiation in an air atmosphere.

When viewed through a circular polariser (either handedness) the printed areas could be clearly seen against a dark background. When viewed through a linear polariser the printed areas appeared darker than the background.

EXAMPLE 2

The following polymerisable LC mixture is prepared

| | |
|---|---|
| Compound (A) | 22.6% |
| Compound (B) | 24.9% |
| Compound (C) | 17.0% |
| Compound (D) | 9.4% |
| Compound (E) | 8.8% |

-continued

| | |
|---|---|
| Compound (F) | 8.4% |
| Compound G | 3.1% |
| Irgacure 907 | 5.5% |
| Zonyl ESO | 0.4% |

(G)

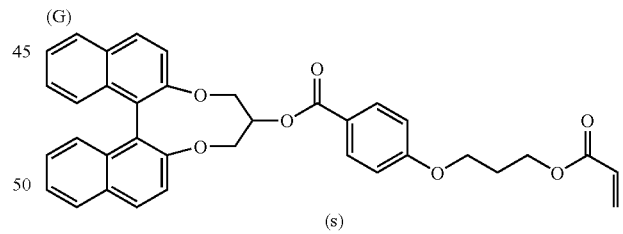

Compound (G) and its preparation are described in EP 01111954.2.

The mixture has the LC phase sequence K 5 N 35 I.

The compounds are heated until an isotropic mixture is formed and then allowed to cool. The mixture can be stored at a temperature of 5° C. without losing its chiral nematic phase.

A sample of the LC mixture was applied onto a polymer printing plate wrapped around a roller. This was then rolled onto a piece of black card and the printed mixture was cured using UV radiation in an air atmosphere.

When viewed through a right-handed circular polariser the printed areas could be clearly seen as a red colour against a dark background. When viewed through a left-handed circular polariser no colour could be seen.

The printed areas demonstrated an angular colour dependance, the colour moving from red through orange to green as the viewing angle moved away from the normal.

The preceding examples can be repeated with similar success by substituting the generically or specifically described reactants and/or operating conditions of this invention for those used in the preceding examples.

The entire disclosures of all applications, patents and publications, cited herein and of corresponding European application No. 02024321.8, filed Nov. 2, 2002 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of preparing a polymer film or marking comprising printing a polymerizable liquid crystal material onto a substrate and polymerizing said liquid crystal material to form the polymer film or marking, wherein the polymerizable liquid crystal material does not contain a solvent, thinner, dispersion agent, polymeric binder, or a monomer compound that can be converted into the polymeric binder by polymerization, and wherein the polymerizable liquid crystal material comprises at least one compound of formula I and/or at least one compound of formula II

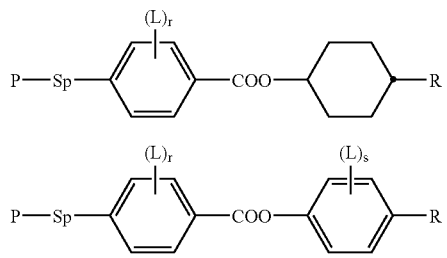

wherein

P is a polymerizable group,

Sp is a spacer group S—X, wherein S is alkylene with up to 20 C atoms which may be unsubstituted, mono- or poly-substituted in each case independently by F, Cl, Br, I or CN, one or more non-adjacent $CH_2$ groups to be optionally being replaced, in each case independently from one another, by —O—, —S—, —NH—, —$NR^0$—, —$SiR^0R^{00}$—, —CO—, —COO—, —OCO—, —S—CO—, —CO—S—, —CH=CH— or —C≡C— in such a manner that O and/or S atoms are not linked directly to one another, R is halogen, straight chain or branched alkyl with 1 to 20 C atoms, that is unsubstituted, mono- or polysubstituted, in each case independently, by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —$SO_2$—, —S—CO—, —CO—S—, —CH=CH— or —C≡C— in such a manner that O and/or S atoms are not linked directly to one another, $R^0$ and $R^{00}$ are, independently of each other, H or alkyl with 1 to 12 C atoms, L is F, Cl, Br, or an alkyl, alkoxy, alkylcarbonyl or alkoxycarbonyl group with 1 to 12 C atoms, wherein one or more H atoms, each independently, are optionally replaced by F or Cl, and r and s are independently of each other 0, 1, 2, 3 or 4.

2. A method according to claim 1, wherein the polymerizable LC material is polymerised at a temperature below 60° C.

3. A method of preparing a polymer film, marking or pigment, comprising printing said polymer film, marking or pigment with a polymerizable liquid crystal material comprising at least one compound of formula I and/or at least one compound of formula II

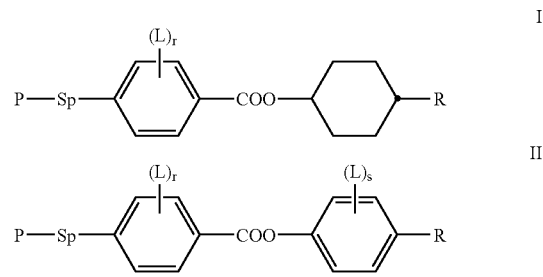

wherein

P is a polymerizable group,

Sp is a spacer group S—X, wherein S is alkylene with up to 20 C atoms which may be unsubstituted, mono- or poly-substituted in each case independently by F, Cl, Br, I or CN, one or more non-adjacent $CH_2$ groups to be optionally being replaced, in each case independently from one another, by —O—, —S—, —NH—, —$NR^0$—, —$SiR^0R^{00}$—, —CO—, —COO—, —OCO—, —S—CO—, —CO—S—, —CH=CH— or —C≡C— in such a manner that O and/or S atoms are not linked directly to one another, X is —O—, —S—, —CO—, —COO—, —OCO—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CX^1$=$CX^2$—, —C≡C—, —CH=CH—COO—, —OCO—CH=CH— or a single bond, $X^1$ and $X^2$ are, independently of each other, H, F, Cl or CN, and R is halogen, straight chain or branched alkyl with 1 to 20 C atoms, that is unsubstituted, mono- or polysubstituted, in each case independently, by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —$SO_2$—, —S—CO—, —CO—S—, —CH=CH— or —C≡C— in such a manner that O and/or S atoms are not linked directly to one another, $R^0$ and $R^{00}$ are, independently of each other, H or alkyl with 1 to 12 C atoms, L is F, Cl, Br, or an alkyl, alkoxy, alkylcarbonyl or alkoxycarbonyl group with 1 to 12 C atoms, wherein one or more H atoms, each independently, are optionally replaced by F or Cl, and r and s are independently of each other 0, 1, 2, 3 or 4, and the polymerizable liquid crystal material does not contain a solvent, thinner, dispersion agent, polymeric binder, or a monomer compound that can be converted into the polymeric binder by polymerization.

4. A method according to claim 3, wherein the polymerizable liquid crystal material is a nematic material.

5. A method according to claim 3, wherein the polymerizable liquid crystal material is a chiral nematic or cholesteric material.

6. A method according to claim 3, wherein the polymerizable liquid crystal material has either a nematic phase or a chiral nematic or cholesteric phase at room temperature.

7. A method according to claim 3, wherein the polymerizable liquid crystal material comprises at least one chiral compound which can be polymerizable or non-polymerizable.

8. A method according to claim 3, wherein the polymerizable liquid crystal material comprises at least one compound of formula I and/or II wherein R is a chiral group.

9. A method according to claim 3, wherein the polymerizable liquid crystal material comprises at least one compound which induces and/or enhances planar alignment.

10. A method according to claim 3, wherein the polymerizable liquid crystal material further comprises at least one polymerizable mesogenic compound having two or more polymerizable groups.

11. A method according to claim 3, wherein the polymerizable liquid crystal material further comprises at least at least one polymerizable mesogenic compound having one polymerizable group.

12. A method according to claim 3, wherein the polymerizable liquid crystal material comprises
3-60% of one or more direactive mesogenic compounds,
7-90% of one or more monoreactive mesogenic compounds of formula I and II,
0 to 70% of one or more further monoreactive mesogenic compounds,
0.1 to 10% of one or more surfactants, and
0.1 to 10% of one or more photoinitiators.

13. A polymerizable liquid crystal material comprising at least one compound of formula I and at least one compound of formula II

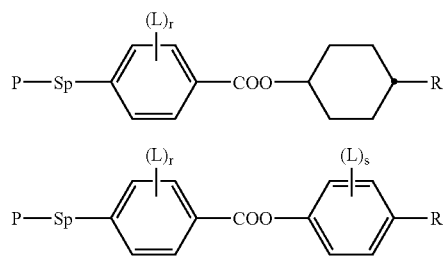

wherein
P is a polymerizable group,
Sp is a spacer group S—X, wherein S is alkylene with up to 20 C atoms which may be unsubstituted, mono- or poly-substituted in each case independently by F, Cl, Br, I or CN, one or more non-adjacent $CH_2$ groups to be optionally replaced, in each case independently from one another, by —O—, —S—, —NH—, —$NR^0$—, —$SiR^0R^{00}$—, —CO—, —COO—, —OCO—, —S—CO—, —CO—S—, —CH=CH— or —C≡C— in such a manner that O and/or S atoms are not linked directly to one another, X is —O—, —S—, —CO—, —COO—, —OCO—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CX^1$=$CX^2$—, —C≡C—, —CH=CH—COO—, —OCO—CH=CH— or a single bond, $X^1$ and $X^2$ are, independently of each other, H, F, Cl or CN, and R is halogen, straight chain or branched alkyl with 1 to 20 C atoms, that is unsubstituted, mono- or polysubstituted, in each case independently, by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —$SO_2$—, —S—CO—, —CO—S—, —CH=CH— or —C≡C— in such a manner that O and/or S atoms are not linked directly to one another, $R^0$ and $R^{00}$ are, independently of each other, H or alkyl with 1 to 12 C atoms, L is F, Cl, Br, or an alkyl, alkoxy, alkylcarbonyl or alkoxycarbonyl group with 1 to 12 C atoms, wherein one or more H atoms, each independently, are optionally replaced by F or Cl, and r and s are independently of each other 0, 1, 2, 3 or 4, and the polymerizable liquid crystal material does not contain a solvent, thinner, dispersion agent, polymeric binder, or a monomer compound that can be converted into the polymeric binder by polymerization.

14. A liquid crystal polymer, liquid crystal pigment, oriented liquid crystal polymer film or marking obtained from a polymerizable liquid crystal material according to claim 13.

15. A liquid crystal pigment obtained from a polymer or polymer film produced from a polymerizable liquid crystal material according to claim 13.

16. An optical, electrooptical, decorative, security, cosmetic, diagnostic, electric, electronic, charge transport, semiconductor, optical recording, electroluminescent, photoconductor or electrophotographic item comprising a polymerisable liquid crystal material according to claim 13, or a liquid crystal polymer, liquid crystal pigment, oriented liquid crystal polymer film or marking obtained from said polymerisable liquid crystal material.

17. A decorative, security, authentication or identification marking, thread or device comprising a polymerizable liquid crystal material according to claim 13, or a liquid crystal polymer, liquid crystal pigment, oriented liquid crystal polymer film or marking obtained from said polymerizable liquid crystal material.

18. A decorative, security, authentication or identification marking, thread or device according to claim 17, comprising at least two chiral nematic materials that differ from each other in their handedness and/or their reflection color and/or their color flop.

19. An object, document of value or hot stamping foil comprising a decorative, security, authentication or identification marking, thread or device according to claim 18.

20. A polymerizable liquid crystal compound that is of formula IIa

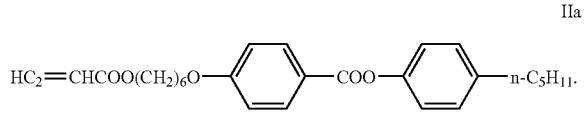

21. A polymerizable liquid crystal material comprising the compound of claim 20 and the compound of formula Ia

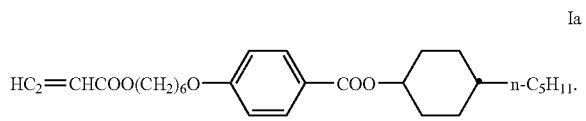

22. A polymerizable liquid crystal material according to claim 13, wherein
in the compound of formula I or II,
r and s are 0,
P is an acrylate, methacrylate, vinyl or epoxy group,
L is F or methyl, or
R is straight chain alkyl with 1 to 15 C atoms, or
wherein in the compound of formula I,
r is 1 or 2, or
wherein in the compound of formula II,
r or s is 1 or 2, or both r and s are 1 or 2.

23. A polymerizable liquid crystal material according to claim 13, wherein in the compound of formula I and/or II, R is a chiral group.

24. A method according to claim 1, wherein the polymerizable liquid crystal material has a nematic or cholesteric phase at 10° C.

25. A method according to claim 3, wherein the polymerizable liquid crystal material has a nematic or cholesteric phase at 10° C.

26. A material according to claim 13, wherein the polymerizable liquid crystal material has a nematic or cholesteric phase at 10° C.

* * * * *

UNITED STATES PATENT AND TRADEMARK OFFICE
CERTIFICATE OF CORRECTION

| | | |
|---|---|---|
| PATENT NO. | : 7,344,762 B2 | Page 1 of 1 |
| APPLICATION NO. | : 10/698946 | |
| DATED | : March 18, 2008 | |
| INVENTOR(S) | : Robert Hammond-Smith | |

It is certified that error appears in the above-identified patent and that said Letters Patent is hereby corrected as shown below:

On the Title Page, Item (30) Foreign Application Priority Data: line 19, reads "Feb. 11, 2002" should read -- Nov. 2, 2002 --

Signed and Sealed this

Twenty-fourth Day of March, 2009

JOHN DOLL
*Acting Director of the United States Patent and Trademark Office*